United States Patent
Braga Lourenço et al.

(10) Patent No.: US 10,649,526 B1
(45) Date of Patent: May 12, 2020

(54) METHOD FOR UPDATING FIELD OF VIEW OF GRAPHICAL USER INTERFACE ON AUGMENTED REALITY

(71) Applicant: SAMSUNG ELECTRÔNICA DA AMAZÔNIA LTDA., Campinas, São Paulo (BR)

(72) Inventors: Alvaro Augusto Braga Lourenço, Manaus (BR); Taynah De Araújo Miyagawa, Manaus (BR)

(73) Assignee: SAMSUNG ELECTRÔNICA DA AMAZÔNIA LTDA., Campinas, Sao Paulo (BR)

( * ) Notice: Subject to any disclaimer, the term of this patent is extended or adjusted under 35 U.S.C. 154(b) by 0 days.

(21) Appl. No.: 16/379,300

(22) Filed: Apr. 9, 2019

(30) Foreign Application Priority Data

Mar. 15, 2019  (BR) ...................... 10 2019 005162 0

(51) Int. Cl.
*G06F 3/01* (2006.01)
*G06F 3/0484* (2013.01)
*G06F 3/0487* (2013.01)

(52) U.S. Cl.
CPC .............. *G06F 3/013* (2013.01); *G06F 3/017* (2013.01); *G06F 3/0487* (2013.01); *G06F 3/04845* (2013.01)

(58) Field of Classification Search
CPC ..... A63F 13/00; A63F 13/25; G02B 27/0093; G02B 27/017; G02B 27/0172; G02B 30/26; G02B 30/52; G02B 2027/0134; G02B 2027/0138; G02B 2027/014; G02B 2027/0178; G02B 2027/0187; G06F 3/011; G06F 3/012; G06F 3/013; G06F 3/014; G06F 3/016; G06F 3/017; G06F 3/0304; G06F 3/0346; G06F 3/0482; G06K 9/00268; G06K 9/00671; G06K 9/00389; G06K 9/4642; G06K 9/4652; G10L 19/00; H04N 13/117; H04N 13/139; H04N 13/189; H04N 13/204; H04N 13/239; H04N 13/271; H04N 13/279; H04N 13/344; H04N 13/366; H04N 13/383; H04N 21/414; H04N 13/371; H04N 2013/0081; H04N 7/185
See application file for complete search history.

(56) References Cited

U.S. PATENT DOCUMENTS

| | | |
|---|---|---|
| 9,317,113 B1 | 4/2016 | Karakotsios et al. |
| 9,761,057 B2 | 9/2017 | Salter et al. |
| 2014/0168056 A1 | 6/2014 | Swaminathan et al. |
| 2016/0284129 A1 | 9/2016 | Nishizawa et al. |

(Continued)

*Primary Examiner* — Nelson M Rosario

(57) ABSTRACT

Method for updating the field of view of a graphical user interface on augmented reality through gaze gestures of a user in a certain direction using a clue component which signalizes the existence of a feature component. The method includes: as the user gazes away from a given origin-pivot graphical user interface, synchronously modifying the clue in position, scale, color and/or form; extending graphical user interface to its adjacencies by preserving spatial reference to the prior context; displaying the feature after the user gazes away from the initial position in an arbitrary angle, distance or amount; and when the user gazes back into the origin/pivot position, the feature component animates its visible state off, while the clue component performs its transformation back into the original state.

8 Claims, 3 Drawing Sheets

(56) References Cited

U.S. PATENT DOCUMENTS

| | | |
|---|---|---|
| 2017/0184848 A1 | 6/2017 | Vallius |
| 2018/0008141 A1* | 1/2018 | Krueger .................. A61B 5/744 |
| 2019/0094981 A1* | 3/2019 | Bradski .................. G02B 30/26 |
| 2019/0313059 A1* | 10/2019 | Agarawala .............. G06T 19/20 |

* cited by examiner

METHOD FOR UPDATING FIELD OF VIEW OF GRAPHICAL USER INTERFACE ON AUGMENTED REALITY

CROSS-REFERENCE TO RELATED APPLICATION

This application is based upon and claims the benefit of priority of the prior Brazilian Patent Application No. 10 2019 005162 0, filed Mar. 15, 2019, the entire contents of which are incorporated herein by reference.

TECHNICAL FIELD

The present invention relates to a method called Feature clue that consists in an element that offers additional context/options that will be displayed to the adjacent areas of the user's main view area, at the same time maintaining connection to it. The focus is to improve the user's perceived field of view (FOV) through graphical user interface (GUI) modifications, without requiring improvements on hardware capabilities.

BACKGROUND

Augmented reality (AR) is an enterprise endeavor to transpose legacy interaction methods to a new layer of superposed interfaces over the world's real objects. The core complexity of this task requires the detection of environment surfaces and semantics across different locations, materials and light conditions.

In opposition to most traditional computer interfaces, displaying graphic interfaces in this new medium is not simple since it does not respond to a regular square canvas with predictable boundaries. The augmented reality canvas is arbitrary for the most part, generally balancing three main constraints in order to perform in a visible and usable manner: the environment surfaces, the device's field of view (FOV), and general computer resources.

Detecting environment surfaces is as fundamental as complex. Commonly labeled as Simultaneous Localization & Mapping (SLAM) and Inertial Measurement Unit (IMU) systems, these algorithms continuously apply complex technology models to identify the user's point of view (POV) within a scene, generally interpreting a sequence of scene features in conjunction with accelerometers and other specialized components. With the point of view at hand, it is still necessary to understand the spatial relation between scene objects, identifying the available planes and surfaces. All this operation needs to cycle several times per second (desirably 60) in order to provide continuity and responsiveness to the user's ever moving head pose, demanding heavy R&D investments to support proper hardware design, performance and autonomy, especially for wearable smart glasses' Head-mounted Displays (HMDs).

The present invention relates to the natural consequences of all these constraints—specially the field of view limitation and the spatial alienation that users experience when Graphical User Interfaces (GUIs) go beyond their narrow HMD screen area—by abstracting one novel interaction model that is able to signalize and open GUI elements in areas adjacent to the one the user is currently looking at.

In the current state of the art, the following technologies that enable the implementation (technical viability) of the present method can be found:

1. Mixed Reality (MR) is the space between augmented reality and virtual reality, which allows real and virtual elements to be combined in varying degrees. Mixed reality is made possible by improvements in computer vision, graphical processing power, display technology, and input systems.

2. Augmented Reality (AR) contains primarily real elements and, therefore, is closer to reality. For example, a user with an AR application on a smartphone will continue perceiving the real world in the normal way, but with additional elements that are displayed through the smartphone—the real-world experience is dominant.

3. Virtual Reality (VR) immerses the user in a completely computer-generated environment, removing any restrictions as to what a user can do or experience.

4. Input/output (I/O) is the communication between an information processing system (e.g. computer) and the outside world. Inputs are the signals or data received by the system and outputs are the signals sent from it.

5. Input device is defined as any device that enters information into an information processing system from an external source (e.g. keyboards, touch screens, mouse, microphones, scanners).

6. Gaze is a form of input and a primary form of targeting within mixed reality. Gaze indicates where the user is looking in the real world and that allows the system to determine the user's intent. It is important to note that MR headsets use the position and orientation of the user's head, not eyes, to determine their gaze vector.

7. In the other side of the input-process-output (IPO) is the Graphical User Interface (GUI). Almost all digital interfaces nowadays are GUIs. An interface is a set of data, commands/controls and/or menus/navigation displayed on a screen, through which a user communicates with a program—in other words, GUI is the part of a system through which the user interacts.

8. AR HMDs (Holographic devices and Immersive devices) are the devices that deliver MR/AR experiences. Holographic devices are characterized by the device's ability to place digital content in the real world and Immersive devices are characterized by the device's ability to hide the physical world and replace it with a digital experience, while creating a sense of presence.

The following solutions that have some similarities with the method of the present invention but that are technically different or have different objectives/purposes are described below.

The patent document U.S. Pat. No. 9,317,113 B1, titled "GAZE ASSISTED OBJECT RECOGNITION", granted on Apr. 19, 2016, by Amazon Technologies, Inc., discloses a user's gaze to define a method that visually recognizes objects in a given scene, offering context information about that specific object. This method would work with devices such as mobile phones or AR devices, operated with or without the aid of a peripheral device/accessory. It differs from the interaction method of the present invention as it describes in detail how this context or any other information would be accessed from the initial reference point, being it a surface, an object, a composition, a pattern, the user body, belongings or accessories, or yet another virtual element.

The patent document US 2014/0168056 A1, titled "ENABLING AUGMENTED REALITY USING EYE GAZE TRACKING", filed on Mar. 15, 2013, by QUALCOMM INCORPORATED, takes eye-tracking data into consideration to limit object/image recognition to a certain portion of what user sees in a given moment. In that sense the recognition results would be shown based on the area of interest instead of just on the general gaze direction. It deviates from the method of the present invention because of the very nature of the proposition, since the method of the present invention is completely agnostic of the accuracy or the underlying technology supporting the capture of gaze inputs.

The patent document EP 1 679 577 A1, titled "ADAPTIVE DISPLAY OF EYE CONTROLLABLE OBJECTS", filed on Jan. 10, 2005, by Tobii Technology AB, discloses eye-tracking input to display an array of items with sizes that change as users look to different portions of an arbitrary modification zone of a computer-based display. While the interaction scopes the behavior of an array of elements while the user's eyes are tracked within a certain modification zone, the method of the present invention is completely agnostic of what is to be controlled, of the gaze methods applied, and of the zones used to control change. Rather than that, it focuses on how one clue can signalize and give access to a related and hidden feature, using one very flexible gaze-based distance relation to understand when the given feature should be signalized and then delivered to the device's field of view.

The patent document US 2017/0184848 A1, titled "AUGMENTED REALITY DISPLAY SYSTEM WITH VARIABLE FOCUS", filed on Dec. 29, 2015, by TUOMAS VALLIUS, describes one specific composition for lenses of near-eye displays, in a way to enable simulated focal variation in augmented reality applications. It is radically distant from the essence of the present invention, given that it focuses on specific composition of materials for near-eye displays, with lenses that can reproduce sensitive focal variation whereas the propositions of the present invention are about how users can interact with the projections that those (and many other) kinds of lenses are able to reproduce.

The patent document US 2016/0284129 A1, titled "DISPLAY, CONTROL, METHOD OF DISPLAY, AND PROGRAM", filed on Feb. 22, 2016, by SEIKO EPSON CORPORATION describes the very basic concept of a HMD device with the ability to display and update the synchronic images served to each eye according to the inputs of eye-distance and controller devices. The description of HMD hardware and concept are however out of the scope of the interaction method of the present invention, which only uses these devices to perform over the flexibility of the software layer, mostly agnostic of the component concept or structure supporting it underneath.

The patent document U.S. Pat. No. 9,761,057 B2, titled "INDICATING OUT-OF-VIEW AUGMENTED REALITY IMAGES", filed on Nov. 21, 2016, by MICROSOFT TECHNOLOGY LICENSING, LLC, discloses that a positional information can be presented in an AR device to inform users about the path to or simply the presence of environment related objects and elements that are not seen in a given moment. It is different from the method of the present invention, which defines instead a very specific way to activate/interact not only with those, but with any type of information or feature, including elements that are not related to one specific environment such as general-purpose GUIs and projections. The method of the present invention also serves the purpose of manipulating the perception of common FOV limitations when using augmented reality devices.

SUMMARY

In view of the aforementioned concerns regarding augmented reality, the current proposal is a method that consists in an element of the current viewing area that offers additional context by synchronically reacting to gaze gestures towards one given direction. The idea is to simulate an expansion of the user's perceived field of view, by creating an additional piece of graphical user interface that preserves spatial reference to the prior context, hence acting as a countermeasure to negative impacts of augmented reality hardware limitations, such as limited field of view (L-FOV) and spatial alienation (SP-AL).

Whenever an AR GUI comes into the user's field of view, the method (Feature clue) is capable of extending graphical user interface to its adjacencies with minimal gaze gestures. This extension of the GUI happens with the use of two components: a 'clue' and a 'feature'. The 'clue' signalizes the existence of a 'feature', optionally causing an implicit or explicit sense of direction for the gaze operation to which it responds. The 'clue' can be any drawable GUI or element in the scene ranging simpler states of the 'feature', informative symbols, or just a minimal sign. It can yet be partially or completely omitted if the designer defines so, while the 'feature' must always be present in order to fully perform the method.

This proposal overcomes the prior art by addressing ways to relativize the bad effects of the current narrow FOVs, while implementing a solution that is minimal in its form, simple to use and yet generic in implementation with augmented reality, mixed reality and virtual reality possibilities.

More specifically, the present invention provides a method for updating the field of view of a graphical user interface on augmented reality through minimal gaze gestures of a user in a certain direction using a clue component which signalizes the existence of a feature component comprising the steps of:

as the user gazes away from a given origin-pivot graphical user interface, the clue is synchronously modified in position, scale, color and/or form;

extending graphical user interface to its adjacencies by preserving spatial reference to the prior context;

displaying the feature after the user gazes away from the initial position in an arbitrary angle, distance or amount;

when the user gazes back into the origin/pivot position, the feature component animates its visible state off, while the clue component performs its transformation back into the original state.

Furthermore, the present invention adds value by providing a method that can be used across platforms and that will be especially useful for the development and launch of Augmented Reality platforms and devices.

BRIEF DESCRIPTION OF THE DRAWINGS

The objectives and advantages of the present invention will become clearer through the following detailed description of the example and non-limitative drawings presented at the end of this document.

DESCRIPTION OF EMBODIMENTS

Overview

As mentioned above, the method of the present invention consists in displaying an element of the current viewing area that offers additional context by synchronically reacting to gaze gestures towards one given direction. This synchronicity allows it to update the graphical user interface (GUI) as a progressive feedback for the head movements as they happen in a certain direction, serving as a clue about what will become available when the user finally gazes enough to that direction. When the user gazes away from the initial context, the feature clue transforms itself into an additional piece of adjacent graphical user interface that preserves spatial reference to the prior context, simulating an expansion of the field of view, thus acting as a countermeasure to negative impacts of augmented reality devices' hardware limitations.

As it will become clearer throughout the detailed description, although focused on acting as a solution for augmented reality, the method of the present invention is not restricted to this application, as it can be used as an additional interaction mode for VR/MR environments.

Limited FOV (L-FOV)

Figure 1:
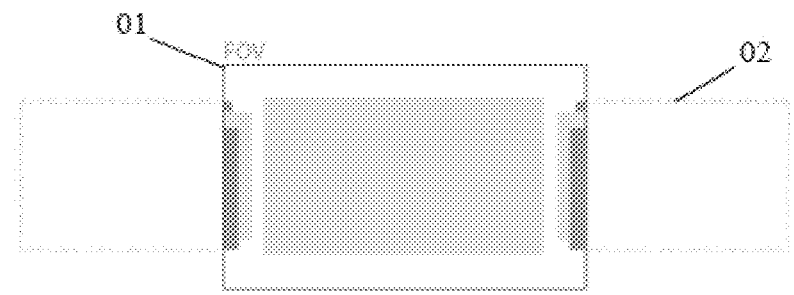
FIG. 1 discloses the common inability of AR displays to cover the full spectrum of human vision. While devices are usually able to render pixels in the central area, side content areas are often omitted.

The pursue for smaller and wearable smart glasses is often limited by the size of its display components. The most common result—as found in Microsoft HoloLens (from 2016), Samsung prototypes (from 2017) and many others —, is that the provided area for printing pixels (FOV~30°) is way narrower than the actual human vision (FOV~110°), covering its central portion (01) while alienating the peripheral areas (02), as demonstrated in FIG. 1. This setup leads to an experience in which it is possible for users to read elements printing at the center of the display, but extremely difficult for them to become fully spatially aware of their digital surroundings.

The result of such circumstance is that the interfaces of smart glasses are scaled way down, from a complete interactive world to one single and restricted gaze-limited composition. As the display size and intense frame updates tension with other factors such as hardware size, energy consumption, weight and thermal throttling, smart AR glasses are a tricky equation to solve with consumer evaluation making things even worse, given the traditional push of popular market verticals towards the exponential increase of resolution, graphics, and display size.

When displays are narrower than the human vision, GUI elements positioned in world surfaces will frequently be presented with squared crops, breaking the suspension of disbelief/immersion and forcing users to remember that the world elements they see are actually printed in an extremely limited display.

With this is mind, all the novelty of AR smart glasses is but an augmented reality trapped inside a reduced screen, a problem that is projected to happen in at least a handful of years to come.

Spatial Alienation (SP-AL)

The underlying capabilities of the human vision are often taken for granted, especially the capabilities regarding peripheral/spatial visualization. It happens in non-stereo areas of the vision, and thus with much lower definition if compared to central areas of focus which support the human capabilities to read, appreciate and analyze. The peripheral vision seems to be a secondary feature in such comparison, but it carries the important task of making the user aware of its surroundings. It is the peripheral vision that makes the elements around the user as referable as those currently under the user's attention, sustaining core capabilities of the user to memorize and navigate spaces, sometimes even in the dark.

Figure 2:
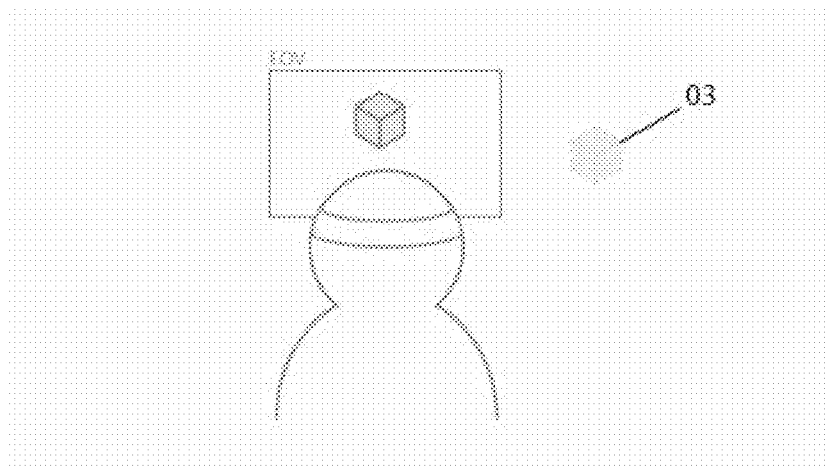
FIG. 2 discloses a situation in which users are not able to notice the presence of a side rendered element, even when it is fitting perfectly into the human field of view.

The angular limitations of traditional AR HMD displays are however a bottleneck to deliver GUIs in the peripheral vision and fulfill the utmost augmented reality promise, one of a digital smart layer covering everything in people's lives. In practical terms, important augmented elements staging right next to a head-mounted display (HMD) user (03) can possibly be just ignored for the simple fact that the user was unaware of its existence, as exemplified by FIG. 2. In a similar manner, even if users were aware of some unrendered GUI elements around them, they would still struggle to search through the entire 360°×360° scene in different scenarios, so that they could spot those elements within their small display.

The spatial alienation of current smart AR glasses is severe to a point that many times using the entire space around the users becomes simply not as useful as intended, because any interaction with this environment turns to, before anything, an undesired search interaction. While it doubles the amount of tasks required to execute any environment based interaction, this canvas constraint also ends up reducing these types of user experiences down to short moments of projection and observation that cannot be extended through time, due to the unlikeness of them being successfully referred to in that same place in the future—it makes sense while the user is focusing it, but after that it becomes a waste of computing resources.

Novel Interactions

Crafting graphical user interfaces for AR HMDs is mostly about using environment surfaces and semantics to originate digital interactive content locked in place. However, even if those elements are static for the most part, it is natural to expect that they will be constantly phasing in and out of users' AR field of view.

The relationship between these two independent variables in circumstances of limited field of view and spatial alienation generates a whole thread of new challenges to information, interaction and visual designers, who need to address new solutions ranging from content findability, legibility, inputs and responses to consider an always variant distance and position between users and interfaces.

Figure 3:
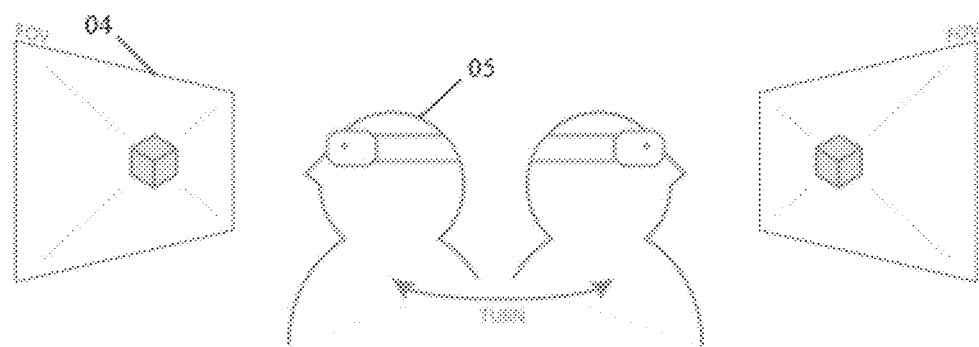
FIG. 3 discloses a common technique to avoid rendered elements phasing in and out of users' augmented reality field of view: by anchoring the elements to the visible area itself.
Figure 4:
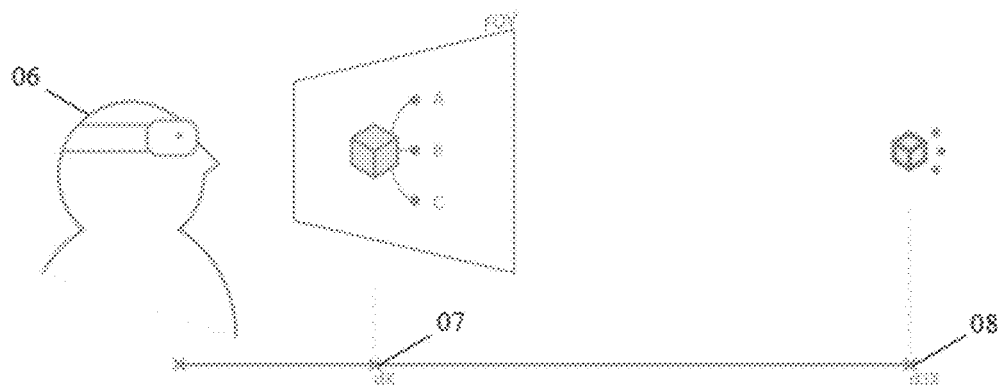
FIG. 4 discloses an example of augmented reality "responsive" behavior that would change presentation and interaction layers of a given element in the scene when the user moves closer or away from it.

In this context, FIG. 3 discloses one common alternative to this problem, which is to hook augmented contents (04) onto the user's pose itself (05), in such a way that make it move along with the user's movements. This first scenario offers the advantage of fixing the distance between users and interfaces so as to facilitate some of the problems related to information design and legibility. Nevertheless, projecting interfaces in the ambient is a larger problem in that sense, because it generally presumes that augmented content must be responsive to the user's positioning. In this second scenario, AR GUI would need to change itself substantially as the user (06) gets closer (07) or farther (08), also offering distinct levels of interaction for different distance ranges, as shown in FIG. 4. Both scenarios are still subjected to the acknowledged limitations of AR displays, which will crop and/or alienate GUIs that eventually goes out of field of view.

Method

Conceiving space for additional GUI in narrow field of views is a tricky and demanded step when designing for augmented reality. Usually the displays are not only narrower, but many times deprived of proper pixel density. With this combination, working the details becomes harder and more limited than in traditional digital media. Because of this, most often AR GUIs have a single element in the main visualization area, putting all the rest (if any) occluded with artificial cuts due to the hard limits of the HMD screen.

Figure 5:
FIG. 5 discloses a typical scenario that does not outline the rendered area of augmented reality. In that situation, side elements might not be completely understood by users, being perceived as mere composition noise.

While it is still possible to place things as fixed over the room or around the user, or may be even push the content a little farther to fit more of it within the renderable screen, these possibilities will often break with critical GUI concerns of readability and definition (as it would use the same number of pixels to render more content/detail), thus compromising all the expected performance and usability. Aside of this, when rendered right from the beginning, cropped secondary side elements will generally add noise (09) to the overall composition, disturbing users from understanding current system state and accomplishing the main task, as shown in FIG. 5. This implies that as the central render space is already small to design common interfaces, more space is often needed to render more GUI as user explores. While the lateral space is typically unavailable, and the alternative of using more of layer-depth abstraction might sound a bit unnatural for same-context tasks, the method of the present invention (Feature Clue) solves this problem by offering designers a convenient way to add more space without overcrowding the main area of the screen with either information or interaction. This becomes possible by expanding the visualization area as users look out the origin/pivot GUI, presenting new features and information right and only when they need it.

Figure 6:
FIG. 6 discloses one of the many examples of a 'clue' and a 'feature' according to an embodiment of the present invention. Generally, the clue acts as a hint to the feature. Both may assume distinct forms and functions given different purposes.

Whenever an AR GUI comes into the user's FOV the method of the present invention extends that graphical user interface to its adjacencies with minimal gaze gestures. This extension of the GUI happens with the use of two components: a 'clue' (10) and a 'feature' (11), shown in FIG. 6. The 'clue' signalizes the existence of a 'feature', optionally causing an implicit or explicit sense of direction for the gaze operation to which it responds.

Figure 7:
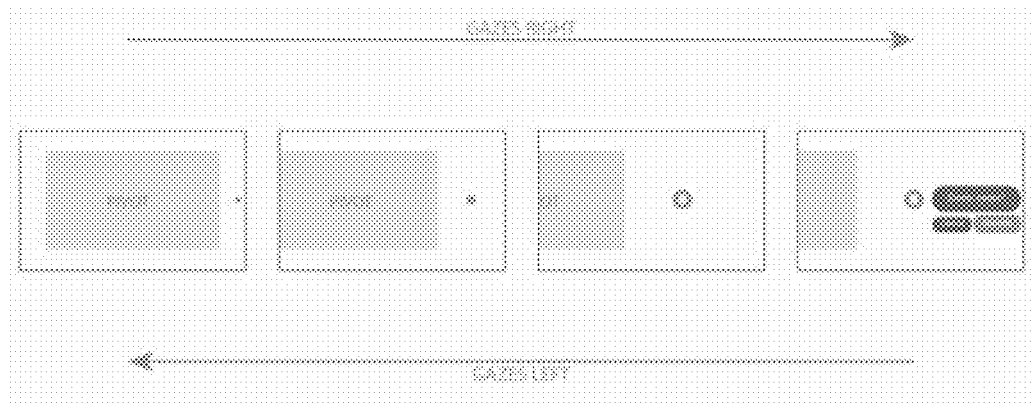
FIG. 7 discloses an example of a reversible feature clue applied to a "delete" function. In that application, users would be able to gaze slightly right to delete the content on the central/pivot area.

These elements perform in three steps, as illustrated by FIG. 7:

1. As the user gazes away from a given origin/pivot GUI, the clue is synchronously modified in position, scale, color and/or form. This happens to signalize that by gazing into that peculiar direction something will eventually happen.

2. The feature appears when the user gazes sufficiently to the side. This may happen by triggering one additional animation if a GUI designer understands that the clue should not be transformed directly into the feature, so that when the feature appears, it might optionally overwrite visibility for the clue.

3. When the user gazes back into the origin/pivot position, the feature piece might animate its visible state off, while the clue performs its transformation back into the original state. This means that the Feature Clue can open just once, or alternatively be reversible.

It is important to note that this three-step description covers only the basic behavior of the Feature Clue. Animations, visuals and state reversibility are tweaked out in a variety of ways in order to suit different application scenarios, directions, and visual language. The 'clue' and its transformation can yet happen in a way to signalize what kind of 'feature' is going to be triggered by the gaze operation. For example, if there is a 'side menu icon' in the main FOV (one that would originate a 'real side menu' as the user looked sideway), the user would be able to presume that a menu will be triggered before it actually does because of the nuanced transformation of the 'menu icon' into the 'actual menu'.

The 'clue' can be any drawable GUI or element in the scene ranging simpler states of the 'feature', informative symbols, or just a minimal sign. It can yet be partially or completely omitted if the designer defines so, while the 'feature' must always be present in order to fully perform the method.

Figure 8:
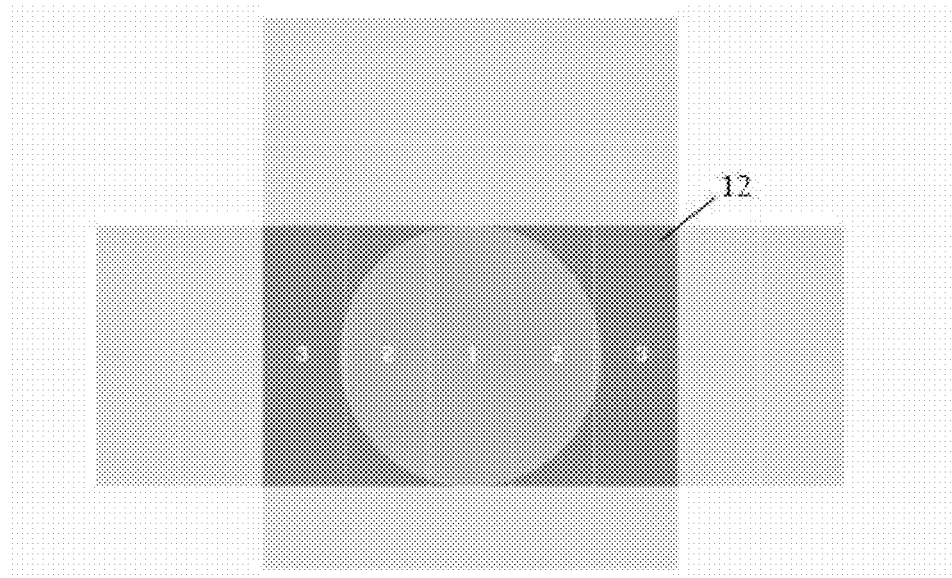
FIG. 8 outlines the maximum recommended extensibility for each side of the augmented reality device, ensuring partial visibility of the 'pivot area' always. General ergonomics points to an upshift in the vertical axis.

It is important to note that, as the field of view is simulated across the adjacent areas of the origin/pivot GUI, the Feature Clue as suggested by the present invention recommends to avoid gaze rotations higher than half of device's field of view itself. FIG. 8 displays how this manages to add about a half of the angular FOV to each cardinal side, without alienating users from the origin content, as the pivot GUI (12) is kept visible during the entire experience, always at the margins of the head-up display (HUD).

Being at the margins also means that the user is able to make spatial and logical correlations between the initial content and the accessed feature when operating the Feature clue. This is made in a manner that makes possible to recreate many of the traditional GUI organizations of legacy mobile and desktop systems (e.g. "this menu is to the side of the main content", or "this footer is right below every content"). The use of consistent patterns throughout the application leverages the value for feature clue scenarios, becoming easier and more efficient as users get more experienced with using the method.

Even with the gaze rotation limitations, the feature clue creates opportunities for AR designers to use a GUI area up to four times bigger than the main drawable canvas, without running into problems such as limited field of view and spatial alienation.

It is important to note that while Feature clue excels within AR and HUD anchored elements, it can still be used for virtual reality and/or together with scene elements as well. As virtual reality generally offers wider field of views, the application of the proposed method might not offer the full advantages of field of view simulation, but it can still be useful as a gaze-based method for general purpose interactions.

Although the present disclosure has been described in connection with certain preferred embodiments, it should be understood that it is not intended to limit the disclosure to those particular embodiments. Rather, it is intended to cover all alternatives, modifications and equivalents possible within the spirit and scope of the disclosure as defined by the appended claims.

What is claimed is:

1. A method for updating a field of view of a graphical user interface on augmented reality through minimal gaze gestures of a user in a certain direction using a clue component which signalizes existence of a feature component, the method comprising:
- as the user gazes away from a given origin-pivot graphical user interface (GUI), synchronously modifying the clue in position, scale, color and/or form;
- extending graphical user interface to its adjacencies by preserving spatial reference to a prior context;
- displaying the feature after the user gazes away from the initial position in an arbitrary angle, distance or amount; and
- when the user gazes back into the origin/pivot position, the feature component animates its visible state off, while the clue component performs transformation back into the original state.

2. The method according to claim 1, further comprising signalizing that a feature component is going to be triggered by a gaze operation.

3. The method according to claim 1, wherein animations, visuals and state reversibility can be tweaked out in a variety of ways in order to suit different application scenarios, directions, and visual language.

4. The method according to claim 1, wherein the clue component is any drawable GUI or element in the scene ranging simpler states of the feature component, informative symbols, or just a minimal sign.

5. The method according to claim 1, wherein the clue alludes to an indicative element of a hidden feature or not.

6. The method according to claim 1, wherein the clue, the feature and/or the sign are bundled or separated from each other.

7. The method according to claim 1, wherein the feature serves to or compose a clue for another clue/sign/feature method cycle.

8. The method according to claim 1, wherein a feature is hidden by a device's insufficient rendering space or by mere design.

* * * * *